United States Patent
Baba et al.

(10) Patent No.: US 12,179,747 B2
(45) Date of Patent: Dec. 31, 2024

(54) DRIVE ASSIST APPARATUS, DRIVE ASSIST METHOD, AND PROGRAM

(71) Applicant: HONDA MOTOR CO., LTD., Tokyo (JP)

(72) Inventors: Ichiro Baba, Wako (JP); Yosuke Koike, Wako (JP); Kenji Komori, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 217 days.

(21) Appl. No.: 18/075,453

(22) Filed: Dec. 6, 2022

(65) Prior Publication Data
US 2023/0202466 A1    Jun. 29, 2023

(30) Foreign Application Priority Data
Dec. 27, 2021   (JP) .................. 2021-213196

(51) Int. Cl.
*B60W 30/09*    (2012.01)
*B60W 10/20*    (2006.01)
*B60W 40/06*    (2012.01)

(52) U.S. Cl.
CPC ............ *B60W 30/09* (2013.01); *B60W 10/20* (2013.01); *B60W 40/06* (2013.01); *B60W 2554/80* (2020.02)

(58) Field of Classification Search
CPC ...... B60W 30/09; B60W 10/20; B60W 40/06; B60W 2554/80; B60W 30/0953; B60W 30/0956; B60W 2554/801; B60W 2554/802
See application file for complete search history.

(56) References Cited

U.S. PATENT DOCUMENTS

2012/0330541 A1* 12/2012 Sakugawa ........... B60W 30/095
701/301

FOREIGN PATENT DOCUMENTS

| JP | 2005-078414 | 3/2005 |
| JP | 2011-051547 | 3/2011 |
| JP | 2015-130069 | 7/2015 |
| JP | 2020-149204 | 9/2020 |

OTHER PUBLICATIONS

Japanese Office Action for Japanese Patent Application No. 2021-213196 mailed May 28, 2024.

\* cited by examiner

*Primary Examiner* — Jacob M Amick
(74) *Attorney, Agent, or Firm* — Amin, Turocy & Watson, LLP

(57) ABSTRACT

A drive assist apparatus includes: an avoidance target recognition portion that recognizes an avoidance target which is a target with which a host vehicle should avoid coming into contact when traveling on a road; a steering control portion that assists steering of the host vehicle at a time of the host vehicle and the avoidance target passing each other; a margin detection portion that detects a margin indicating a distance between the host vehicle and the avoidance target at the time of passing each other; and a level change portion that changes a steering assistance degree of the host vehicle by the steering control portion at subsequent times of passing each other based on the margin detected by the margin detection portion.

7 Claims, 7 Drawing Sheets

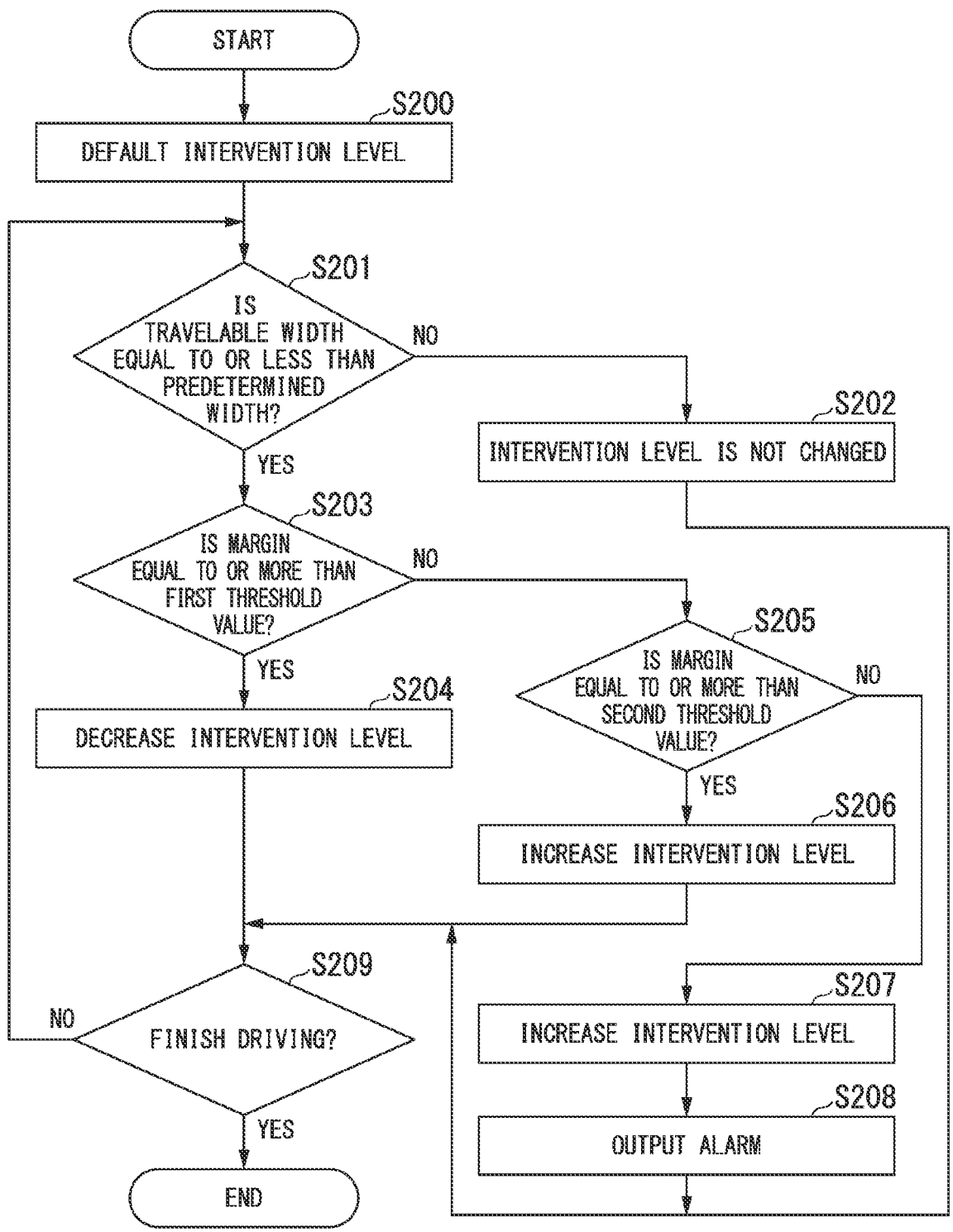

DRIVE ASSIST APPARATUS, DRIVE ASSIST METHOD, AND PROGRAM

CROSS-REFERENCE TO RELATED APPLICATION

Priority is claimed on Japanese Patent Application No. 2021-213196, filed on Dec. 27, 2021, the contents of which are incorporated herein by reference.

BACKGROUND

Field of the Invention

The present invention relates to a drive assist apparatus, a drive assist method, and a program.

Background

In recent years, a drive assist apparatus has been disclosed which assists driving of a driver when a host vehicle passes an oncoming vehicle. For example, Japanese Unexamined Patent Application, First Publication No. 2020-149204 describes a technique that controls steering of a host vehicle depending on positions of the host vehicle or an oncoming vehicle when the host vehicle travels on a road (narrow road) in which the road width is narrow.

SUMMARY

However, according to the technique described in Japanese Patent Application, First Publication No. 2020-149204, since a steering control is performed without considering a driving characteristic of a driver, there may be a case in which a steering assistance cannot be appropriately performed.

An aspect of the present invention is intended to provide a drive assist apparatus, a drive assist method, and a program capable of appropriately performing a steering assistance in consideration of a driving characteristic of a driver.

A drive assist apparatus according to a first aspect of the present invention includes: an avoidance target recognition portion that recognizes an avoidance target which is a target with which a host vehicle should avoid coming into contact when traveling on a road; a steering control portion that assists steering of the host vehicle at a time of the host vehicle and the avoidance target passing each other; a margin detection portion that detects a margin indicating a distance between the host vehicle and the avoidance target at the time of passing each other; and a level change portion that changes a steering assistance degree of the host vehicle by the steering control portion at subsequent times of passing each other based on the margin detected by the margin detection portion.

A second aspect is the drive assist apparatus according to the first aspect described above, wherein the level change portion may decrease the steering assistance degree in a case where the margin detected by the margin detection portion is equal to or more than a first threshold value, and the level change portion may increase the steering assistance degree in a case where the margin detected by the margin detection portion is less than the first threshold value.

A third aspect is the drive assist apparatus according to the second aspect described above which may further include an alarm output control portion that causes an output device to output an alarm in a case where the margin detected by the margin detection portion is less than a second threshold value that is smaller than the first threshold value.

A fourth aspect is the drive assist apparatus according to any one of the first to third aspects described above, wherein the margin detection portion may detect, as the margin, a shortest distance between the host vehicle and the avoidance target at the time of passing each other.

A fifth aspect is the drive assist apparatus according to any one of the first to fourth aspects described above which may further include: a travelable width detection portion that detects a travelable width indicating a width of the road where the host vehicle is travelable, wherein the level change portion may not change the steering assistance degree in a case where the travelable width detected by the travelable width detection portion is larger than a predetermined width.

A sixth aspect of the present invention is a drive assist method by a computer, including: recognizing an avoidance target which is a target with which a host vehicle should avoid coming into contact when traveling on a road; assisting steering of the host vehicle at a time of the host vehicle and the avoidance target passing each other; detecting a margin indicating a distance between the host vehicle and the avoidance target at the time of passing each other; and changing a steering assistance degree of the host vehicle at subsequent times of passing each other based on the detected margin.

A seventh aspect of the present invention is a computer-readable non-transitory recording medium which includes a program causing a computer to: recognize an avoidance target which is a target with which a host vehicle should avoid coming into contact when traveling on a road; assist steering of the host vehicle at a time of the host vehicle and the avoidance target passing each other; detect a margin indicating a distance between the host vehicle and the avoidance target at the time of passing each other; and change a steering assistance degree of the host vehicle at subsequent times of passing each other based on the detected margin.

According to the first to seventh aspects described above, it is possible to appropriately perform a steering assistance in consideration of a driving characteristic of a driver.

BRIEF DESCRIPTION OF THE DRAWINGS

FIG. 7 is a flowchart showing an example of a process flow performed by a drive assist apparatus according to the second embodiment.

DESCRIPTION OF EMBODIMENTS

Hereinafter, a drive assist apparatus, a drive assist method, and a program according to an embodiment of the present invention will be described with reference to the drawings.

First Embodiment

[Overall Configuration]

Figure 1:
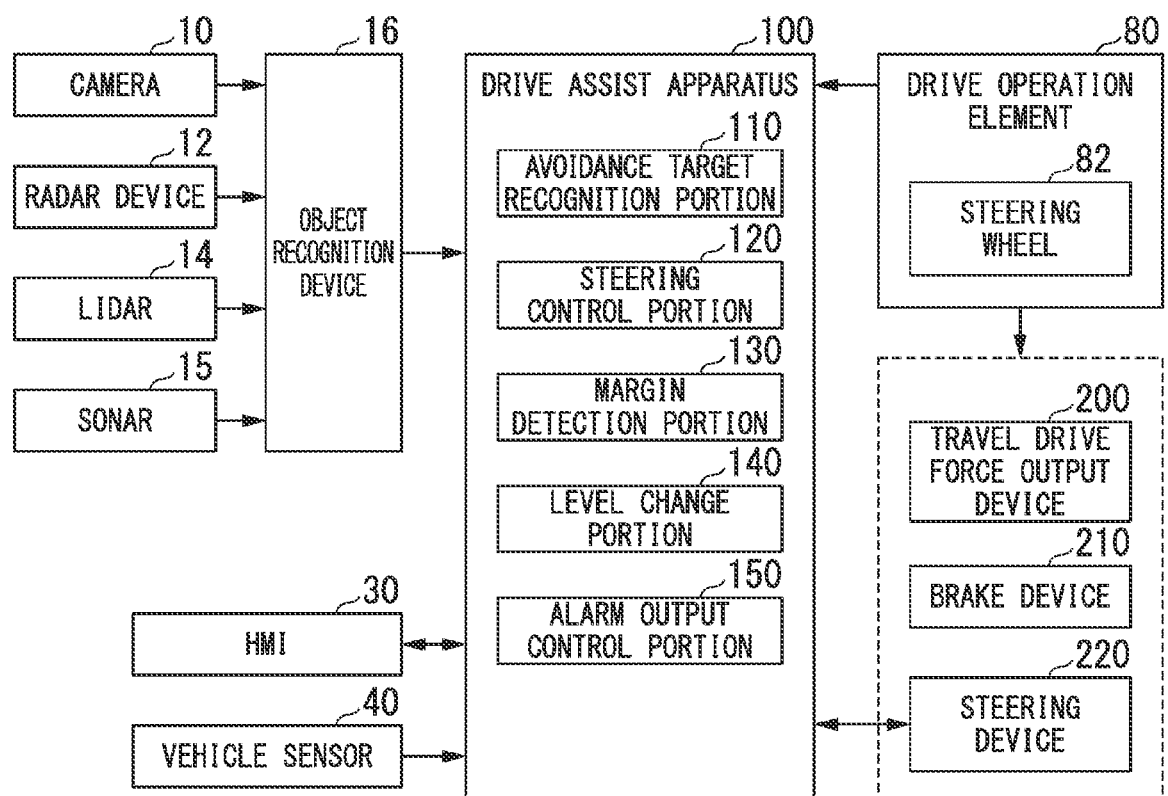
FIG. 1 is a configuration view of a vehicle system utilizing a drive assist apparatus according to a first embodiment.

FIG. 1 is a configuration view of a vehicle system 1 utilizing a drive assist apparatus according to a first embodiment.

A vehicle on which the vehicle system 1 is provided is, for example, a two-wheel, three-wheel, or four-wheel vehicle, and a drive source thereof is an internal combustion engine such as a diesel engine or a gasoline engine, an electric motor, or a combination thereof. The electric motor operates using electric power generated by an electric generator connected to the internal combustion engine, or electric power discharged from a secondary battery or a fuel cell.

The vehicle system 1 includes, for example, a camera 10, a radar device 12, a LIDAR (Light Detection And Ranging) 14, a sonar 15, an object recognition device 16, a HMI (Human Machine Interface) 30, a vehicle sensor 40, a drive operation element 80, a drive assist apparatus 100, a travel drive force output device 200, a brake device 210, and a steering device 220. These devices and apparatuses are connected to one another by a multiplex communication line such as a CAN (Controller Area Network) communication line, a serial communication line, a wireless communication network, or the like. The configuration shown in FIG. 1 is merely an example. Part of the configuration may be omitted, or another configuration may be further added.

The camera 10 is, for example, a digital camera that utilizes a solid-state imaging device such as a CCD (Charge-Coupled Device) or a CMOS (Complementary Metal-Oxide-Semiconductor). The camera 10 is attached to an arbitrary place of a vehicle on which the vehicle system 1 is provided. When a forward direction is imaged, the camera 10 is attached to an upper portion of a front windshield, a rear surface of a rearview mirror, or the like. For example, the camera 10 periodically repeatedly images the vicinity of the vehicle. The camera 10 may be a stereo camera.

The radar device 12 radiates radio waves such as millimeter waves to the vicinity of the vehicle, detects radio waves (reflected waves) reflected by an object, and detects at least a position (a distance and an orientation) of the object. The radar device 12 is attached to an arbitrary place of the vehicle. The radar device 12 may detect the position and speed of the object using a FM-CW (Frequency-Modulated Continuous Wave) method.

The LIDAR 14 radiates light (or electromagnetic waves having a wavelength close to that of light) to the vicinity of the vehicle and measures scattered light. The LIDAR 14 detects a distance to a target on the basis of time from light emission to light reception. The radiated light is, for example, pulsed laser light. The LIDAR 14 is attached to an arbitrary place of the vehicle. The LIDAR 14 detects the distance from the vehicle to the target by scanning in a transverse direction and a longitudinal direction relative to a proceeding direction of the vehicle.

The sonar 15 radiates ultrasonic waves to the vicinity of the vehicle, detects reflection or scattering by an object that is present within a predetermined distance from the vehicle, and thereby detects a distance to the object, a position of the object, or the like. The sonar 15 is provided, for example, on a front end portion and a rear end portion of the vehicle and is arranged on a bumper or the like.

The object recognition device 16 performs a sensor fusion process on a result of detection performed by some or all of the camera 10, the radar device 12, the LIDAR 14, and the sonar 15 and recognizes a position, a type, a speed, and the like of the object. The object recognition device 16 outputs a result of recognition to the drive assist apparatus 100. The object recognition device 16 may output the result of detection by the camera 10, the radar device 12, the LIDAR 14, and the sonar 15 as is to the drive assist apparatus 100. The function of the object recognition device 16 may be incorporated into the drive assist apparatus 100, and the object recognition device 16 may be omitted from the vehicle system 1. The object recognized by the object recognition device 16 includes an avoidance target which is a target with which the vehicle should avoid coming into contact when traveling on a road, and a road boundary which is a boundary between a road and a portion other than the road.

The HMI 30 presents various types of information to an occupant of the vehicle and receives an input operation by the occupant. The HMI 30 includes various display devices, a speaker, a buzzer, a touch panel, a switch, a key, and the like.

The vehicle sensor 40 includes a vehicle speed sensor that detects a speed of the vehicle, an acceleration sensor that detects acceleration, a yaw rate sensor that detects an angular speed around a vertical axis, an orientation sensor that detects a direction of the vehicle, and the like.

The drive operation element 80 includes, for example, a steering wheel 82 and other operation elements (an accelerator pedal, a brake pedal, a shift lever, a modified steering, a joystick, and the like). A sensor that detects an operation amount or the presence or absence of an operation is attached to the drive operation element 80, and the detection result is output to the drive assist apparatus 100 or some or all of the travel drive force output device 200, the brake device 210, and the steering device 220.

The travel drive force output device 200 outputs a travel drive force (torque) for the vehicle to travel to a drive wheel. The travel drive force output device 200 includes, for example, a combination of an internal combustion engine, an electric motor, a transmission, and the like, and an ECU (Electronic Control Unit) that controls these. The ECU controls the configuration described above, for example, in accordance with information input from the drive operation element 80.

The brake device 210 includes, for example, a brake caliper, a cylinder that transmits a hydraulic pressure to the brake caliper, an electric motor that generates a hydraulic pressure in the cylinder, and a brake ECU. The brake ECU controls the electric motor, for example, in accordance with the information input from the drive operation element 80 such that a brake torque corresponding to a braking operation is output to each wheel. The brake device 210 may include, as a backup, a mechanism that transmits the hydraulic pressure generated by an operation of the brake pedal included in the drive operation element 80 to the cylinder via a master cylinder.

The steering device 220 includes, for example, a steering ECU and an electric motor.

The electric motor changes a direction of a steering wheel, for example, by applying a force to a rack and pinion mechanism. The steering ECU drives the electric motor and changes the direction of the steering wheel in accordance with information input from the drive assist apparatus 100 or information input from the drive operation element 80.

The drive assist apparatus 100 is a device that assists driving of a vehicle by a driver. The drive assist apparatus 100 includes, for example, an avoidance target recognition portion 110, a steering control portion 120, a margin detection portion 130, a level change portion 140, and an alarm output control portion 150. The avoidance target recognition portion 110, the steering control portion 120, the margin detection portion 130, the level change portion 140, and the alarm output control portion 150 are each realized, for example, by a hardware processor such as a CPU (Central Processing Unit) executing a program (software). Some or all of these components may be realized by hardware (a circuit portion; including circuitry) such as a LSI (Large-Scale Integration), an ASIC (Application-Specific Integrated Circuit), a FPGA (Field-Programmable Gate Array), and a GPU (Graphics-Processing Unit), and may also be realized by cooperation of software and hardware. The program may be stored in advance in a storage device (a storage device that includes a non-transitory storage medium) of the drive assist apparatus 100 such as a HDD or a flash memory, or may be stored in a removable storage medium (non-transitory storage medium) such as a DVD or a CD-ROM and be installed to the HDD or the flash memory of the drive assist apparatus 100 by the storage medium being attached to a drive device.

The avoidance target recognition portion 110 recognizes an avoidance target which is a target with which a host vehicle should avoid coming into contact when traveling on a road on the basis of a recognition result that is output from the object recognition device 16. The avoidance target includes, for example, a traffic participant such as an oncoming vehicle and a pedestrian, a static obstacle such as a power pole, a parked vehicle, and an abandoned object, and a road boundary.

The steering control portion 120 assists steering of the host vehicle when the host vehicle and the avoidance target (the oncoming vehicle or the like) pass each other. The steering assistance is an operation that assists a steering operation performed by the driver and is performed by controlling the steering device 220. For example, the steering control portion 120 assists such that the driver can operate the steering wheel 82 with a light force.

The margin detection portion 130 detects a margin indicating the distance between the host vehicle and the avoidance target when the host vehicle and the avoidance target (the oncoming vehicle or the like) pass each other. For example, the margin detection portion 130 may detect the distance between the host vehicle and the avoidance target on the basis of a detection result of the sonar 15. The detection method of the margin detection portion 130 is not limited thereto, and the margin may be detected by using another sensor. Further, the margin detection portion 130 may detect, as the margin, the shortest distance between the host vehicle and the avoidance target at the time of passing each other.

The level change portion 140 changes a steering assistance degree of the host vehicle by the steering control portion 120 at next or subsequent times of passing each other on the basis of the margin detected by the margin detection portion 130. For example, the level change portion 140 can change an assist force with respect to the steering operation by changing an intervention level indicating the degree of intervening in the steering assistance of the host vehicle. Hereinafter, a change process of the intervention level of the present embodiment is described in detail.

[Change Process of Intervention Level of Steering Assistance]

Figure 2:
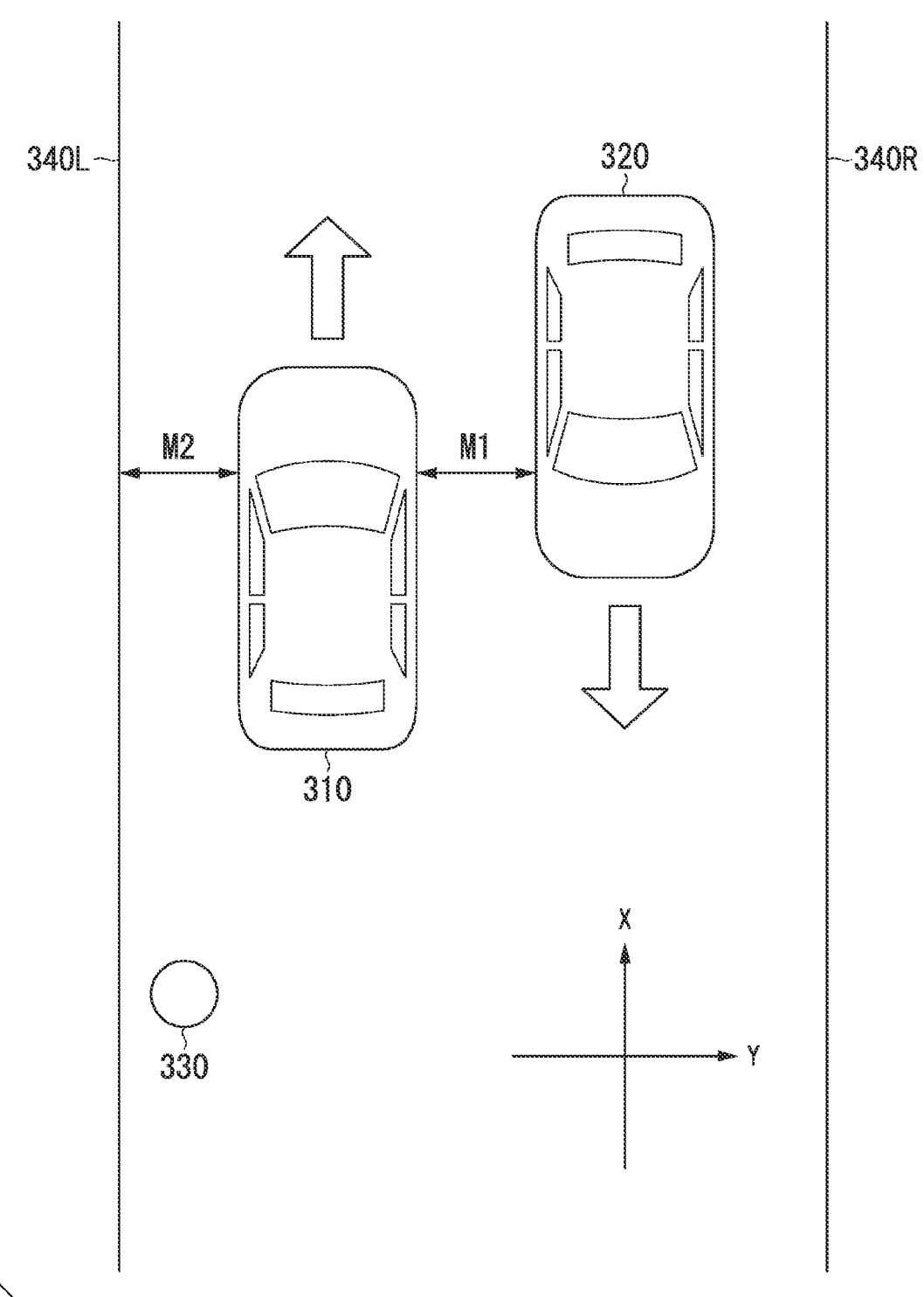
FIG. 2 is a view showing a host vehicle and an oncoming vehicle passing each other.

FIG. 2 is a view showing a host vehicle and an oncoming vehicle passing each other. In FIG. 2, an upward direction is an X direction, and a rightward direction is a Y direction. A host vehicle 310 travels in a +X direction, and an oncoming vehicle 320 travels in a −X direction.

When the driver of the host vehicle 310 is not familiar with driving, there is a possibility that the host vehicle 310 does not travel in the middle of a lane but travels near the right side or the left side of the lane. Therefore, it is necessary to detect the distance between the host vehicle 310 and a target (avoidance target) with which the host vehicle 310 should avoid coming into contact when traveling on the road. In the example of FIG. 2, the avoidance target is the oncoming vehicle 320, a power pole 330, and road boundaries 340L, 340R. The road boundaries 340L, 340R are, for example, a white line, a guardrail, a wall, a step, or the like. In order to detect the distance between the host vehicle 310 and the avoidance target, the host vehicle 310 detects margins M1, M2 by the margin detection portion 130.

The margin M1 is a right margin of the host vehicle 310. In the example of FIG. 2, the margin M1 indicates a distance in the Y direction between the host vehicle 310 and the oncoming vehicle 320 when the host vehicle 310 and the oncoming vehicle 320 pass each other. The margin M2 is a left margin of the host vehicle 310. In the example of FIG. 2, the margin M2 indicates a distance in the Y direction between the host vehicle 310 and the road boundary 340L. When the host vehicle 310 passes the power pole 330, the margin M2 indicates a distance between the host vehicle 310 and the power pole 330. The margins M1, M2 may be detected, for example, on the basis of a detection result of the sonar 15.

For example, when the margin M1 is small, since the distance between the host vehicle 310 and the oncoming vehicle 320 is small, it is necessary to operate the steering wheel 82 to the left such that the host vehicle 310 does not come into contact with the oncoming vehicle 320. At this time, the steering control portion 120 assists such that the driver can easily operate the steering wheel 82 to the left.

On the other hand, when the margin M2 is small, since the distance between the host vehicle 310 and the road boundary 340L is small, it is necessary to operate the steering wheel 82 to the right such that the host vehicle 310 does not come into contact with the wall, the guardrail, the power pole 330, or the like. At this time, the steering control portion 120 assists such that the driver can easily operate the steering wheel 82 to the right.

Figure 3:
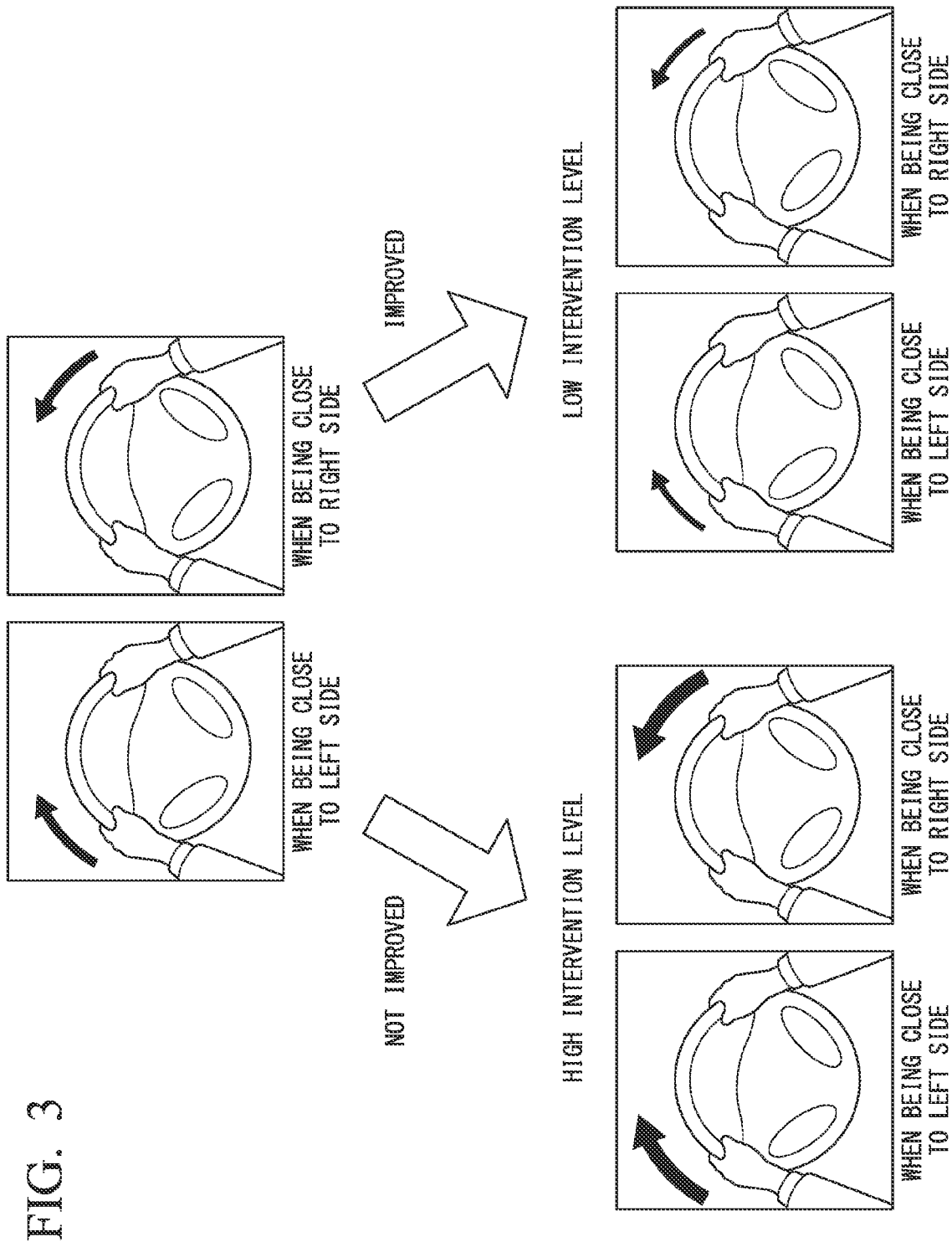
FIG. 3 is a view describing a change in an intervention level of a steering assistance.

FIG. 3 is a view describing a change in an intervention level of a steering assistance. In the steering assistance of the present embodiment, as described above, when the host vehicle 310 is close to the right side (when the margin M1 is small), the steering control portion 120 assists such that the driver can easily operate the steering wheel 82 to the left. When the host vehicle 310 is close to the left side (when the margin M2 is small), the steering control portion 120 assists such that the driver can easily operate the steering wheel 82 to the right.

However, in order to appropriately perform the steering assistance, the degree (intervention level) of intervention of the steering assistance intervention can be preferably changed in consideration of a driving characteristic of a driver. For example, an inexperienced driver having a low driving skill may drive without sufficiently ensuring at least one of the right margin M1 and the left margin M2 of the host vehicle 310. In the case of such a driver, the steering control portion 120 increases the degree of intervention of the steering assistance. On the other hand, an experienced driver having a high driving skill may drive while sufficiently ensuring the right margin M1 and the left margin M2 of the host vehicle 310. In the case of such a driver, the steering control portion 120 decreases the degree of intervention of the steering assistance.

Accordingly, the level change portion 140 changes the intervention level of the steering assistance in response to the driving characteristic of the driver. Specifically, the steering control portion 120 controls the steering device 220 such that as the intervention level of the steering assistance becomes higher, the assist force with respect to the steering operation of the driver becomes larger.

For example, as shown in FIG. 3, with respect to a driver who tends to travel near the right side or the left side of a road or in a lane, when the driving is not improved, by increasing the intervention level of the steering assistance, the assist force with respect to the steering operation of the driver is increased. On the other hand, when the driving is improved, by decreasing the intervention level of the steering assistance, the assist force with respect to the steering operation of the driver is decreased. Thereby, the drive assist apparatus 100 can appropriately perform the steering assistance in consideration of the driving characteristic of the driver.

[Flowchart of Drive Assist Apparatus]

Figure 4:
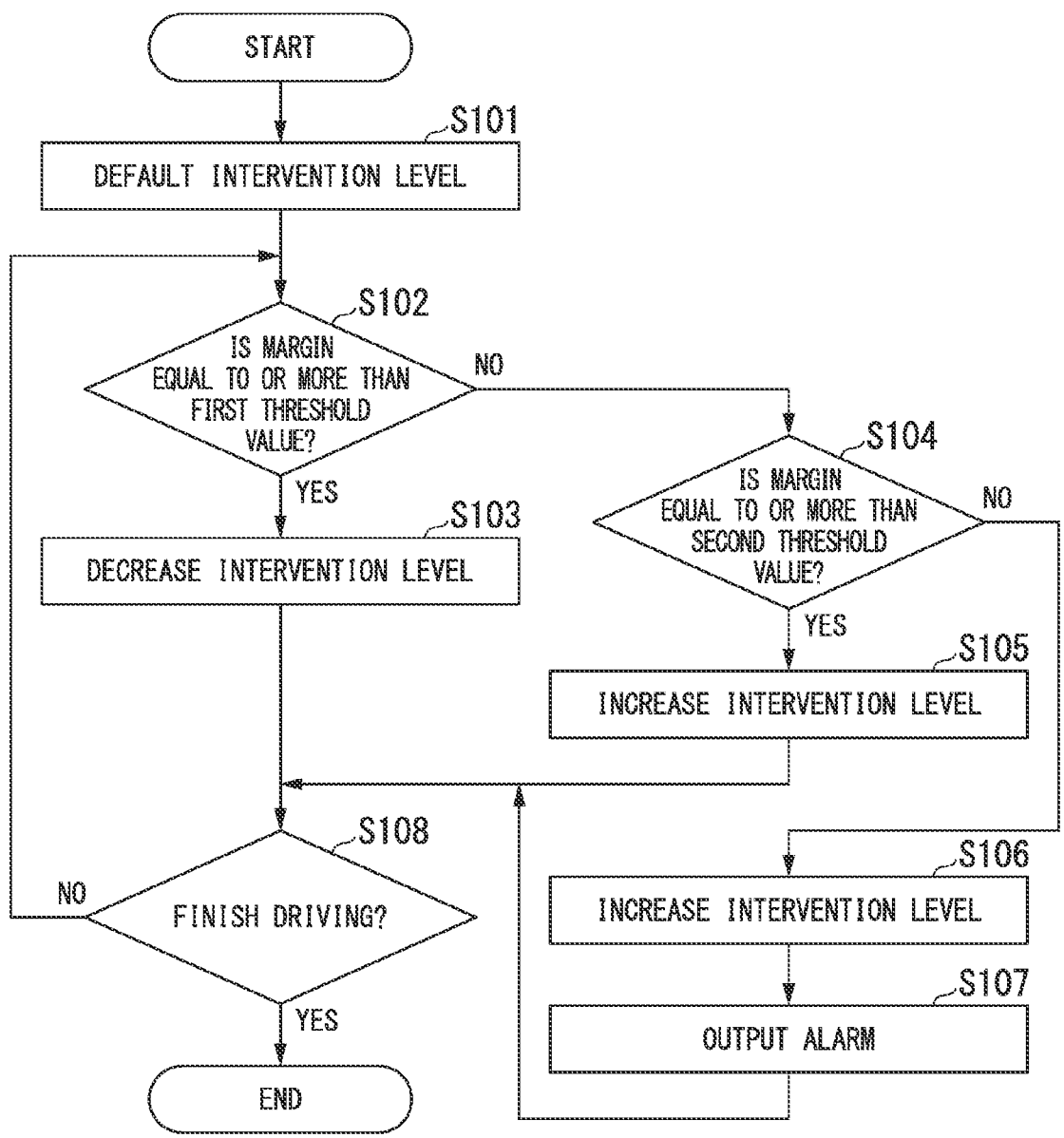
FIG. 4 is a flowchart showing an example of a process flow performed by a drive assist apparatus according to the first embodiment.

FIG. 4 is a flowchart showing an example of a process flow performed by the drive assist apparatus 100 according to the first embodiment. The present flowchart is performed in response to a driver starting driving the host vehicle 310. First, the level change portion 140 of the drive assist apparatus 100 sets the intervention level of the steering assistance to a default value (Step S101).

Next, the avoidance target recognition portion 110 recognizes an avoidance target (the oncoming vehicle 320, the power pole 330, the road boundaries 340L, 340R, and the like) which is a target with which the host vehicle 310 should avoid coming into contact when traveling on the road. The margin detection portion 130 detects the margins M1, M2 indicating the distance between the host vehicle 310 and the avoidance target when the host vehicle 310 and the avoidance target pass each other. For example, the margin detection portion 130 detects, as the margin, the shortest distance between the host vehicle 310 and the avoidance target when the host vehicle 310 passes the avoidance target. The level change portion 140 determines whether or not the margins M1, M2 detected by the margin detection portion 130 are equal to more than a first threshold value TH1 (Step S102). The first threshold value TH1 is a preset value and is, for example, a value of about 30 cm.

When both of the margins M1, M2 are equal to or more than the first threshold value TH1, the level change portion 140 decreases the intervention level of the steering assistance (Step S103). In this way, when the driver drives while sufficiently ensuring right and left margins of the host vehicle 310, the assist force with respect to the steering operation of the driver at subsequent times of passing each other is decreased. When the change process of the intervention level shown in Step S103 is completed, the routine proceeds to a process of Step S108 which will be described later.

On the other hand, when at least one of the margins M1, M2 is less than the first threshold value TH1, the level change portion 140 determines whether or not both of the margins M1, M2 detected by the margin detection portion 130 are equal to or more than a second threshold value TH2 that is smaller than the first threshold value TH1 (Step S104). The second threshold value TH2 is a preset value and is, for example, a value of about 10 cm.

When both of the margins M1, M2 are equal to or more than the second threshold value TH2, the level change portion 140 increases the intervention level of the steering assistance (Step S105). In this way, when the driver drives without sufficiently ensuring right and left margins of the host vehicle 310, the assist force with respect to the steering operation of the driver at subsequent times of passing each other is increased. When the change process of the intervention level shown in Step S105 is completed, the routine proceeds to a process of Step S108 which will be described later.

On the other hand, when at least one of the margins M1, M2 is less than the second threshold value TH2, the level change portion 140 increases the intervention level of the steering assistance (Step S106). In this case, since the margin is less than the second threshold TH2 (a value of about 10 cm), the host vehicle 310 may come into contact with the avoidance target. Therefore, in Step S106, the level change portion 140 may increase the intervention level of the steering assistance more greatly than in Step S105. In this way, when the right and left margins of the host vehicle 310 are extremely insufficient, the assist force with respect to the steering operation of the driver at subsequent times of passing each other is further increased.

Further, in this case, since there is a possibility that the driver is not aware that the right and left margins are not sufficiently ensured, or the driver is intentionally driving without sufficiently ensuring the right and left margins, the alarm output control portion 150 causes the HMI 30 to output an alarm to the driver (Step S107).

For example, the alarm output control portion 150 may cause a speaker included in the HMI 30 to output a message indicating that the host vehicle 310 is too close to the right or left side. An output method of the alarm is not limited thereto; and, for example, the alarm output control portion 150 may cause a display device included in the HMI 30 to display a message indicating that the host vehicle 310 is too close to the right or left side. Thereby, it is possible to let the driver know that the right and left margins of the host vehicle 310 are extremely insufficient. When the alarm process shown in Step S107 is completed, the process proceeds to a process of Step S108 which will be described later.

Next, the level change portion 140 determines whether or not the driving is finished (Step S108). For example, the level change portion 140 determines that the driving is finished when the driver stops the engine of the host vehicle 310. When it is determined that the driving is finished, the process by the present flowchart is finished. On the other hand, when it is not determined that the driving is finished, the routine returns to the process of Step S102 described above.

The steering control portion 120 performs the steering assistance of the host vehicle 310 at the next time of passing each other in accordance with the intervention level of the steering assistance determined by the process using the flowchart of FIG. 4. Specifically, the steering control portion 120 controls the steering device 220 such that as the intervention level of the steering assistance becomes higher, the assist force with respect to the steering operation of the driver becomes larger. Thereby, it is possible to appropriately perform the steering assistance in consideration of the driving characteristic of the driver.

According to the first embodiment described above, the steering control portion 120 assists the steering of the host vehicle at a time of the host vehicle 310 and the avoidance target (the oncoming vehicle 320 or the like) passing each other, the margin detection portion 130 detects the margins M1, M2 indicating the distance between the host vehicle 310 and the avoidance target at the time of passing each other, and the level change portion 140 changes the steering assistance degree of the host vehicle 310 by the steering control portion 120 at subsequent times of passing each other on the basis of the margins M1, M2 detected by the margin detection portion 130.

Second Embodiment

Next, a second embodiment will be described. In the first embodiment, the intervention level of the steering assistance is changed regardless of the travelable width of the road. On the other hand, in the second embodiment, when the travelable width of the road is larger than a predetermined width, by not changing the steering assistance degree, a process load of the drive assist apparatus 100 is reduced. Hereinafter, the detail of the second embodiment is described.

[Overall Configuration]

Figure 5:
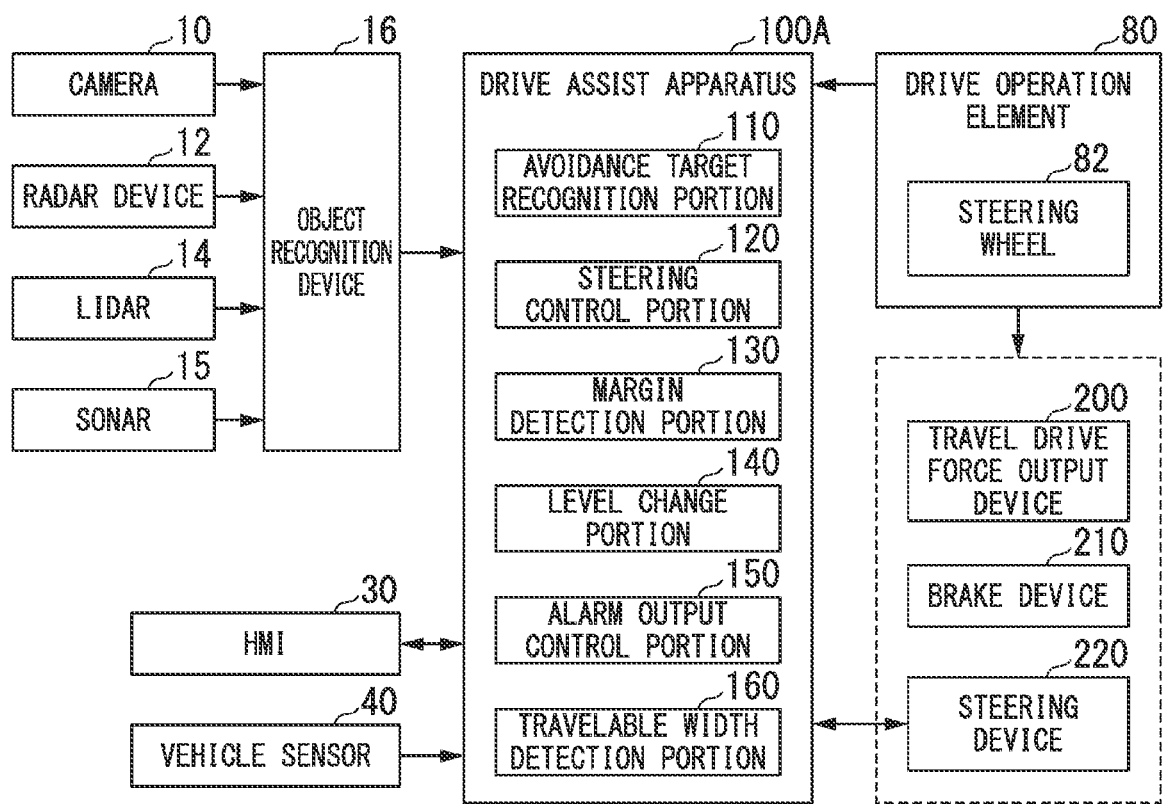
FIG. 5 is a configuration view of a vehicle system utilizing a drive assist apparatus according to a second embodiment.

FIG. 5 is a configuration view of a vehicle system 1 utilizing a drive assist apparatus according to a second embodiment.

In FIG. 5, a portion that corresponds to each portion of FIG. 1 is denoted by the same reference numeral, and the description thereof is omitted. A drive assist apparatus 100A of the second embodiment includes a travelable width detection portion 160.

The travelable width detection portion 160 is realized, for example, by a hardware processor such as a CPU executing a program (software). Some or all of these components may be realized by hardware (a circuit portion; including circuitry) such as a LSI, an ASIC, a FPGA, and a GPU, and may also be realized by cooperation of software and hardware. The program may be stored in advance in a storage device (a storage device that includes a non-transitory storage medium) of the drive assist apparatus 100A such as a HDD or a flash memory, or may be stored in a removable storage medium (non-transitory storage medium) such as a DVD or a CD-ROM and be installed to the HDD or the flash memory of the drive assist apparatus 100A by the storage medium being attached to a drive device.

[Detection Process of Travelable Width]

Figure 6:
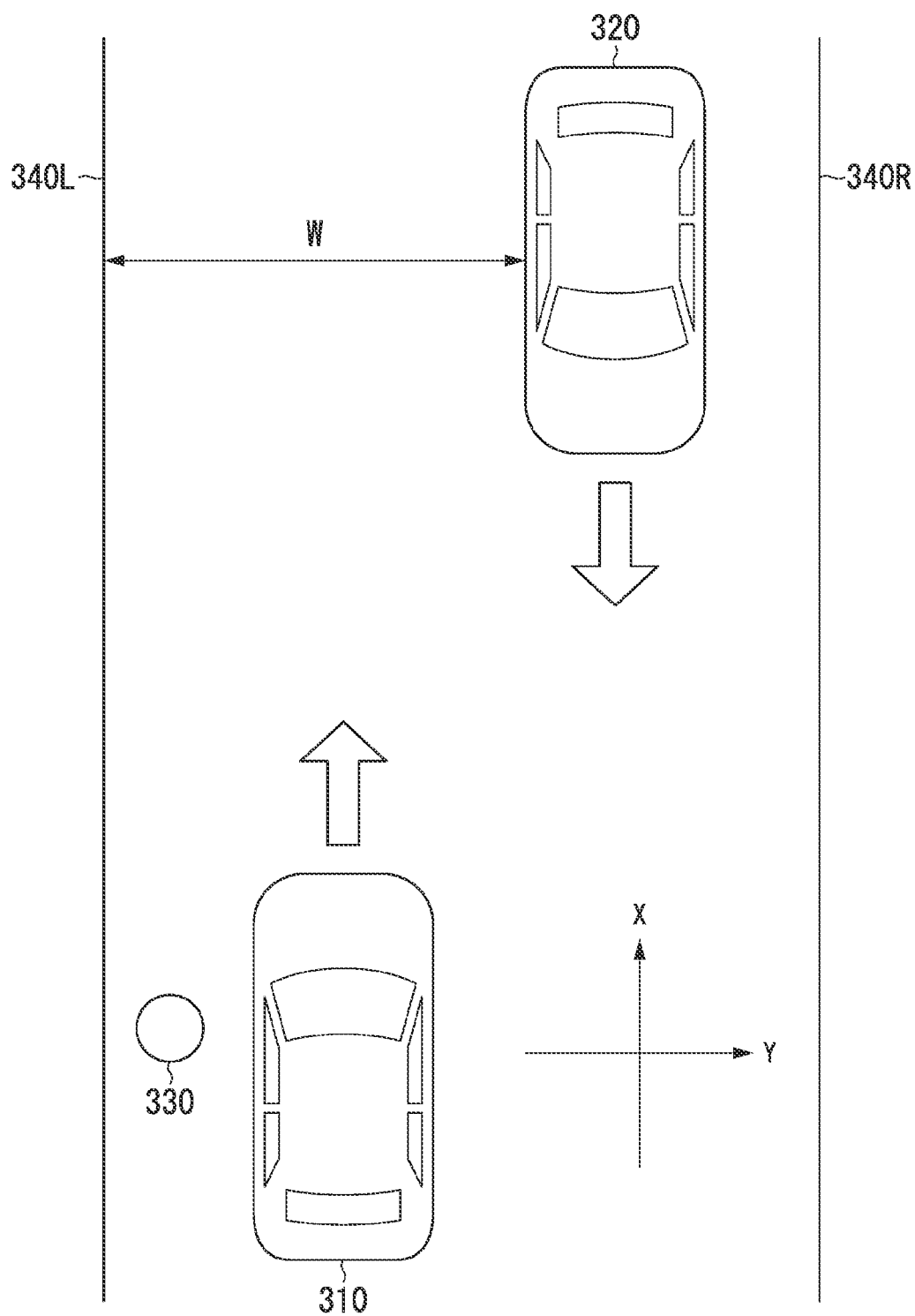
FIG. 6 is a view describing a detection of a travelable width.

FIG. 6 is a view for describing a detection of a travelable width. In FIG. 6, an upward direction is a X direction, and a rightward direction is a Y direction. The host vehicle 310 travels in a +X direction, and the oncoming vehicle 320 travels in a −X direction.

The travelable width detection portion 160 detects a travelable width W indicating a width of a road in the Y direction where the host vehicle 310 is travelable. In the example shown in FIG. 6, the travelable width W is a distance between the oncoming vehicle 320 and the road boundary 340L. For example, the travelable width detection portion 160 may detect the travelable width W on the basis of a detection result of the LIDAR 14. The detection method of the travelable width detection portion 160 is not limited thereto, and the travelable width W may be detected by using another sensor.

When the travelable width W is sufficiently large, a possibility that the host vehicle 310 comes too close to the avoidance target (the oncoming vehicle 320, the power pole 330, a wall, a guardrail, or the like) or comes into contact with the avoidance target is low. Therefore, in the present embodiment, the level change portion 140 does not change the intervention level when the travelable width W detected by the travelable width detection portion 160 is larger than a predetermined width. Thereby, it is possible to reduce a process load of the drive assist apparatus 100A compared to the first embodiment.

[Flowchart of Detection Device]

FIG. 7 is a flowchart showing an example of a process flow performed by the drive assist apparatus 100A according to the second embodiment. The present flowchart is performed in response to a driver starting driving the host vehicle 310. First, the level change portion 140 of the drive assist apparatus 100A sets the intervention level of the steering assist to a default value (Step S200).

Next, the travelable width detection portion 160 detects the travelable width W, for example, on the basis of the detection result of the LIDAR 14. The level change portion 140 determines whether or not the travelable width W detected by the travelable width detection portion 160 is equal to or less than a predetermined width W1 (Step S201). The predetermined width W1 is a preset value and is, for example, a value of about 275 cm. When it is determined that the travelable width W is larger than the predetermined width W1, the level change portion 140 determines that the intervention level of the steering assistance is not changed (Step S202), and the routine proceeds to the process of Step S209.

On the other hand, when it is determined that the travelable width W is equal to or less than the predetermined width W1, the routine proceeds to the process of Step S203 such that the level change portion 140 performs a change process of the intervention level. Since the processes of Step S203 to Step S209 in FIG. 7 are similar to those of Step S102 to Step S108 in FIG. 4, the description thereof is omitted.

The second embodiment described above provides effects similar to those of the first embodiment and also has a feature that the level change portion 140 does not change the steering assistance degree when the travelable width W detected by the travelable width detection portion 160 is larger than the predetermined width W1. That is, the level change portion 140 adjusts the degree (intervention level) of the steering intervention at subsequent times on the basis of the right and left margins of the host vehicle 310 only in a case of a narrow road having a predetermined width or less or in a situation similar to the narrow road due to passing the oncoming vehicle 320 or the like. Thereby, it is possible to reduce the process load of the drive assist apparatus 100A.

The embodiments described above are applied to a vehicle that includes a drive assist apparatus having a function of the steering assistance but can also be applied to a vehicle that includes an automated driving function which does not completely automate the steering operation.

The embodiments described above can be represented as follows.

A drive assist apparatus includes: a storage device that stores a program; and a hardware processor, wherein the hardware processor executes the program stored in the storage device and thereby performs: recognizing an avoidance target which is a target with which a host vehicle should avoid coming into contact when traveling on a road; assisting steering of the host vehicle at a time of the host vehicle and the avoidance target passing each other; detecting a margin indicating a distance between the vehicle and the avoidance target at the time of passing each other; and changing a steering assistance degree of the host vehicle at subsequent times of passing each other based on the detected margin.

Although a mode for implementing the present invention has been described using the embodiments, the present invention is not limited to such embodiments, and various modifications and substitutions can be made without departing from the scope of the present invention.

What is claimed is:

1. A drive assist apparatus, comprising:
    an avoidance target recognition portion that recognizes an avoidance target which is a target with which a host vehicle should avoid coming into contact when traveling on a road;
    a steering control portion that assists steering of the host vehicle at a time of the host vehicle and the avoidance target passing each other;
    a margin detection portion that detects a margin indicating a distance between the host vehicle and the avoidance target at the time of passing each other; and
    a level change portion that changes a steering assistance degree of the host vehicle by the steering control portion at subsequent times of passing each other based on the margin detected by the margin detection portion.

2. The drive assist apparatus according to claim 1,
    wherein the level change portion decreases the steering assistance degree in a case where the margin detected by the margin detection portion is equal to or more than a first threshold value, and
    the level change portion increases the steering assistance degree in a case where the margin detected by the margin detection portion is less than the first threshold value.

3. The drive assist apparatus according to claim 2, further comprising:
    an alarm output control portion that causes an output device to output an alarm in a case where the margin detected by the margin detection portion is less than a second threshold value that is smaller than the first threshold value.

4. The drive assist apparatus according to claim 1,
    wherein the margin detection portion detects, as the margin, a shortest distance between the host vehicle and the avoidance target at the time of passing each other.

5. The drive assist apparatus according to claim 1, further comprising:
    a travelable width detection portion that detects a travelable width indicating a width of the road where the host vehicle is travelable,
    wherein the level change portion does not change the steering assistance degree in a case where the travelable width detected by the travelable width detection portion is larger than a predetermined width.

6. A drive assist method by a computer, comprising:
    recognizing an avoidance target which is a target with which a host vehicle should avoid coming into contact when traveling on a road;
    assisting steering of the host vehicle at a time of the host vehicle and the avoidance target passing each other;
    detecting a margin indicating a distance between the host vehicle and the avoidance target at the time of passing each other; and
    changing a steering assistance degree of the host vehicle at subsequent times of passing each other based on the detected margin.

7. A computer-readable non-transitory recording medium which includes a program causing a computer to:
    recognize an avoidance target which is a target with which a host vehicle should avoid coming into contact when traveling on a road;
    assist steering of the host vehicle at a time of the host vehicle and the avoidance target passing each other;
    detect a margin indicating a distance between the host vehicle and the avoidance target at the time of passing each other; and
    change a steering assistance degree of the host vehicle at subsequent times of passing each other based on the detected margin.

* * * * *